US011958957B2

(12) United States Patent
Kulshreshtha et al.

(10) Patent No.: US 11,958,957 B2
(45) Date of Patent: Apr. 16, 2024

(54) POLYOLEFIN COMPOSITION PROVIDING MARKING BY FLUORESCENCE

(71) Applicant: BOREALIS AG, Vienna (AT)

(72) Inventors: Bhawna Kulshreshtha, Vienna (AT);
Denis Yalalov, Stenungsund (SE);
Francis Costa, Linz (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 17/840,001

(22) Filed: Jun. 14, 2022

(65) Prior Publication Data

US 2022/0306834 A1 Sep. 29, 2022

Related U.S. Application Data

(62) Division of application No. 15/734,741, filed as application No. PCT/EP2019/065364 on Jun. 12, 2019, now abandoned.

(30) Foreign Application Priority Data

Jun. 19, 2018 (EP) ..................... 18178455

(51) Int. Cl.
| C08K 5/00 | (2006.01) |
| B41M 5/26 | (2006.01) |
| C08K 3/04 | (2006.01) |
| C08K 5/45 | (2006.01) |
| C08L 23/06 | (2006.01) |
| C09K 11/06 | (2006.01) |

(52) U.S. Cl.
CPC ........... *C08K 5/0041* (2013.01); *B41M 5/267* (2013.01); *C08K 3/04* (2013.01); *C08K 5/45* (2013.01); *C08L 23/06* (2013.01); *C09K 11/06* (2013.01); *C08L 2201/08* (2013.01); *C08L 2203/202* (2013.01); *C08L 2207/062* (2013.01); *C09K 2211/1051* (2013.01)

(58) Field of Classification Search
CPC .................................................. C08K 5/0041
See application file for complete search history.

(56) References Cited

U.S. PATENT DOCUMENTS

2006/0046050 A1* 3/2006 Hall-Goulle ........... C09K 11/06
428/364
2007/0290172 A1 12/2007 Momose et al.
2010/0036031 A1* 2/2010 Herbst .................. H01B 3/441
524/331
2014/0127438 A1 5/2014 Sherman, Jr. et al.
2016/0152853 A1 6/2016 Meier et al.
2020/0308465 A1 10/2020 Zhang et al.

FOREIGN PATENT DOCUMENTS

| CN | 1117927 A | 3/1996 |
| CN | 102786727 A | 11/2012 |
| EP | 0710570 A1 | 5/1996 |
| EP | 0924095 A1 | 6/1999 |
| EP | 1162232 A1 | 12/2001 |
| WO | 2014074596 A1 | 5/2014 |
| WO | 2015199842 A1 | 12/2015 |
| WO | 2017221102 A1 | 12/2017 |
| WO | 2019243134 A1 | 12/2019 |

OTHER PUBLICATIONS

Technical Information, Plastic Additives—Tinopal OB, BASF Schweiz AG, pp. 1-3, Aug. 2010.*
Moreau et al. "Fine structure of defects in polyethylene used for power cable insulation observed by fluorescence microscopy" Journal of Materials Science, 1993, 28, 161-169. (Year: 1993).*
International Search Report and Written Opinion for PCT/EP2019/065364, dated Sep. 9, 2019, 12 pages.
Extended European Search Report for EP18178455, dated Nov. 30, 2018, 5 pages.
Technical Information, Plastic Additives—Tinuvin 783, BASF Schweiz AG, pp. 1-2, Nov. 2010.

* cited by examiner

*Primary Examiner* — Peter F Godenschwager
(74) *Attorney, Agent, or Firm* — Lowenstein Sandler LLP

(57) ABSTRACT

The present invention is directed to a polyolefin composition comprising carbon black which shows fluorescence when irradiated with UV light. The polyolefin composition of the present invention comprises a polyolefin, carbon black in an amount of 0.25 to 1.0 wt %, an optical brightener in an amount of 0.001 to 0.1 wt %, and a UV agent.

The present invention is further directed to a molded article comprising the polyolefin composition of the present invention. The present invention is further directed to a wire or cable comprising an outer layer comprising the polyolefin composition of the present invention. Finally, the present invention is directed to a method for detection of a polyolefin composition by UV light and to a method for detection of a molded article or a wire or cable by UV light.

16 Claims, 1 Drawing Sheet

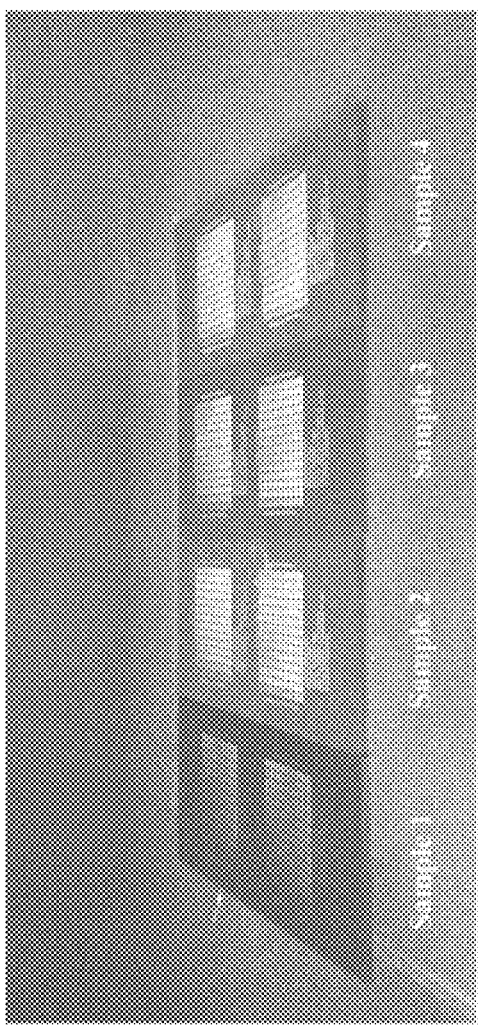

POLYOLEFIN COMPOSITION PROVIDING MARKING BY FLUORESCENCE

CROSS-REFERENCE TO RELATED APPLICATION(S)

The present application is a Divisional Application of U.S. patent application Ser. No. 15/734,741 filed on Dec. 3, 2020, which is a national phase of International Application No. PCT/EP2019/065364, filed on Jun. 12, 2019, which claims the benefit of European Patent Application No. 18178455.4, filed on Jun. 19, 2018. The contents of these applications are hereby incorporated by reference in their entirety.

FIELD OF THE INVENTION

The present invention is directed to a polyolefin composition comprising carbon black which shows fluorescence when irradiated with UV light. It is suitable for many applications where marking of a molded article made of a polyolefin composition is required, e.g. as outer layer of a wire or cable or in automotive applications. The present invention is further directed to a molded article comprising the polyolefin composition of the present invention. The present invention is further directed to a wire or cable comprising an outer layer comprising the polyolefin composition of the present invention. Finally, the present invention is directed to a method for detection of a polyolefin composition by UV light and to a method for detection of a molded article or wire or cable by UV light.

BACKGROUND

Marking of molded articles is a continued need to indicate serial numbers and further information thereon. The skilled person knows suitable methods for marking of molded articles made of polyolefin compositions like those based on polyethylene or polypropylene, e.g. conventional printing techniques like ink jet, embossing etc. In the area of communication and power cables, marking is necessary in order to provide information to the installer, such that the installation is done correctly and efficiently. Similarly, in the automotive field, marking is necessary to provide information about the manufacturer of the molded article since often a particular molded article to be used in e.g. a car is received from more than one supplier. Also several further data is often required on a molded article, e.g. productions dates, expiry dates, bar codes, and company logos.

For many applications, however, conventional printing techniques like ink jet, embossing etc. are not suitable, since the outer surface of the molded article is not sufficient for providing a print using the conventional techniques, or since the shape of the molded article does not allow printing with conventional techniques, e.g. since the relevant part of the surface of the molded article is non-planar.

Therefore, use of laser printing techniques is gaining more importance. In particular for fiber optic micro cables (FOC), conventional printing techniques are not suitable, given the very small outer surface of such micro cables. The increased need for micro cables has accordingly also increased the use of laser printing. One of the advantages of laser printing is that such printing can be performed at higher line speed compared to the alternatives, thus increasing cost-efficiency. Another advantage is that a laser-induced print cannot be erased so easily by rubbing or friction as opposed to ink-jet print.

EP 0 924 095 A1 discloses a method for marking a polyolefin composition comprising irradiating with a YAG laser a polyolefin composition containing 0.1 to 1.0 part by weight of carbon black per 100 parts by weight of the polyolefin composition, wherein the carbon black has an average secondary particle size of not smaller than 150 nm.

Apart from the importance of marking of the surface of a molded article with e.g. text and labels, which may provide important information about the type and/or origin of the molded article, it would be also desirable to have a marking which is typical for the particular molded article or for the underlying polyolefin composition and which marking cannot be seen at first glance but is visible under particular conditions. For example, it would be desirable if an individual wire or cable, or a certain type of wire or cable, could be easily identified amongst other wires or cables. This could be interesting in case of malfunction and help to identify the particular wire or cable which shall be advantageously disconnected or replaced, e.g. in a cable funnel with several different cables.

Amongst the possibilities of further marking is in general the addition of agents which cause fluorescence upon irradiation with UV light, so-called optical brighteners or fluorescent agents. However, in case of outer layers of wires or cables the high load of carbon black usually prevents any visible detection of fluorescence. Similar considerations apply of course for molded articles containing carbon black used in different fields of applications, e.g. automotive.

There is accordingly still a need for providing a polyolefin composition comprising carbon black which shows fluorescence when irradiated with UV light.

BRIEF DESCRIPTION OF THE FIGURES

FIG. 1 shows the laser printed samples as indicated in Table 1, wherein the samples are irradiated with UV light, here 250-400 nm.

DETAILED DESCRIPTION

The present invention is based on the finding that the object can be solved by provision of a polyolefin composition comprising an ethylene or propylene homo- or copolymer, carbon black, an optical brightener and a UV agent. The polyolefin composition is suitable for many applications, e.g. in the field of automotive, or for a cable jacketing layer, i.e. an outer layer of a wire or cable, and provides good results in laser printing, too.

The polyolefin composition according to the present invention has the advantage of showing fluorescence upon irradiation with UV light.

Accordingly, the present invention is in one aspect directed to a polyolefin composition comprising
(A) a polyolefin,
(B) carbon black in an amount of 0.25 to 1.0 wt % based on the weight of the polyolefin composition,
(C) an optical brightener in an amount of 0.001 to 0.1 wt % based on the weight of the polyolefin composition, and
(D) a UV agent.

It should be noted that in polyolefin compositions of the prior art used as jacketing (outer layer) of fiber optic micro cables (FOC), the amount of carbon black is at least 2.5 wt %. This amount of carbon black is normally necessary in order to provide sufficient UV stability to the jacketing layer.

The polyolefin composition according to the present invention further comprises a UV agent to compensate the lack of carbon black, i.e. the relatively low amount of carbon black, and accordingly provide sufficient protection against UV light.

It is believed that the reduced amount of carbon black allows the visible detection of fluorescence.

Polyolefin (A)

The polyolefin (A) is preferably selected from the group consisting of an ethylene homopolymer, an ethylene copolymer, a propylene homopolymer, a propylene copolymer, a blend of an ethylene homopolymer and an ethylene copolymer, and a blend of a propylene homopolymer and a propylene copolymer.

The ethylene homopolymer, the ethylene copolymer, the propylene homopolymer, and the propylene copolymer may consist of more than one homopolymer or copolymer, respectively, i.e. two homopolymers differing in the molecular weight distribution, two copolymers differing in the molecular weight distribution and/or differing in the content and/or type of comonomer. The same counts for the homopolymer and the copolymer in the blends. Further on, in these blends also the homopolymer and the copolymer may differ in the molecular weight distribution.

The terms "ethylene homopolymer" and "propylene homopolymer" as used herein relate to a polyethylene or polypropylene, respectively, that consists substantially, i.e. of at least 99.5 wt %, more preferably of at least 99.8 wt %, of ethylene or propylene units, respectively. In a preferred embodiment only ethylene or propylene units, respectively, are used in polymerization. In a preferred embodiment only ethylene or propylene units, respectively, are detectable in the ethylene homopolymer or propylene homopolymer, respectively. The comonomer content can be determined with $^{13}$C NMR spectroscopy.

The term "copolymer" as used herein covers polymers obtained from co-polymerisation of at least two, i.e. two, three or more different monomers, i.e. the term "copolymer" as used herein does e.g. not exclude so-called terpolymers obtained from co-polymerisation of three different monomers.

The content of the polyolefin (A) in the polyolefin composition of the present invention is usually at least 90 wt %, preferably at least 95 wt %, more preferably at least 98 wt %, and still more preferably at least 98.5 wt %. The content of the polyolefin (A) in the polyolefin composition of the present invention is usually not higher than 99.5 wt %.

Suitable ethylene homopolymers are low density polyethylene (LDPE, density of 0.910-0.940 g/cm$^3$) and high density polyethylene (HDPE, density of at least 0.941 g/cm$^3$). The latter is preferred for cable applications.

The melt flow rate of suitable ethylene homopolymers is preferably 0.2 to 3.0 g/10 min, more preferably 0.2 to 2.0 g/10 min.

Suitable ethylene copolymers are linear low density polyethylene (LLDPE, density of 0.915-0.925 g/cm$^3$) and very low density polyethlylene (VLDPE, density of 0.880-0.915 g/cm$^3$). Suitable comonomers are $C_3$-$C_{12}$-alpha-olefins, preferably 1-butene, 1-hexene, 4-methyl-1-pentene, and/or 1-octene.

Suitable propylene homopolymers are high isotactic propylene homopolymers.

Suitable propylene copolymers are copolymers, i.e. random and block copolymers, with ethylene and/or a $C_4$-$C_{12}$-alpha-oelfin, preferably with ethylene, 1-butene, 1-hexene, 4-methyl-1-pentene, and/or 1-octene. Suitable propylene copolymers include impact copolymers having a matrix which is a propylene homopolymer or a propylene random copolymer having dispersed therein an ethylene-propylene rubber (EPR).

The polyolefin (A) may be unimodal or bimodal. Preferably, the polyolefin (A) of the present invention is bimodal, more preferably the polyolefin of the present invention is multimodal polyethylene consisting of a low-molecular weight ethylene homopolymer mixed with a high-molecular weight copolymer of ethylene and butene, 4-methyl-1-pentene, 1-hexene, or 1-octene.

A suitable polyolefin (A) according to the present invention is a polyolefin having properties required in the technical area of jacketing, i.e. a polyolefin providing low shrinkage, high Environmental Stress Crack Resistance (ESCR) and low Flexural Modulus. Thus, the polyolefin (A) of the present invention preferably has the following ESCR properties: F10>1500 h, more preferably >8000 h; F1>700 h, more preferably >3000 h. In this regard, the polyolefin (A) according to the present invention may be high density polyethylene (HDPE) or polypropylene.

Carbon Black (B)

The skilled person knows carbon black as additive in polyolefin compositions. Together with the UV agent it provides protection against UV light.

The polyolefin composition according to the present invention comprising 0.25-1.0 wt % carbon black is suitable for laser printing and provides a light-coloured visible marking with good contrast towards dark background of black colour. It is believed that the irradiation from the laser beam decomposes the carbon black into volatile components. These volatile components as well as the absorption of heat from the laser beam foam the surface, which scatters light and leaves a light-colored impression. The polyolefin composition according to the present invention comprising carbon black in the range varying from 0.25 to 1.0 wt % exhibits a good performance for laser marking. In the presence of a higher amount of carbon black, laser marking efficiency deteriorates, and when the amount of carbon black is above 1.0 wt %, poor contrast is achieved. The particular selected range of amount of carbon black allows the visible detection of fluorescence.

Preferably, the amount of carbon black in the polyolefin composition is 0.25-0.75 wt %, more preferably 0.25-0.5 wt %.

According to the present invention, carbon black may be added in the form of a masterbatch, wherein carbon black is dispersed in a suitable matrix, such as a polyolefin matrix. Alternatively, carbon black may be added directly.

UV Agent (D)

As mentioned above, it has been noted that at rather low carbon black loadings, e.g. loadings below 2.5 wt %, degradation of the base resin (polyolefin) caused by UV irradiation may occur. The UV agent provides additional protection against UV light.

The amount of UV agent is preferably 0.1-1.0 wt %, more preferably 0.2-0.5 wt %, and still more preferably 0.2-0.3 wt %, based on the weight of the polyolefin composition.

Suitable UV agents are benzoates, triazoles, triazines or hindered amines. Particularly, a mixture of equal amounts of dimethyl succinate polymer with 4-hydroxy-2,2,6,6,-tetramethyl-1-piperidineethanol and poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]]) (Tinuvin 783 FDL, commercially available from BASF) may be used as UV-agent.

Optical Brightener (C)

Optical brighteners are known to the skilled person and are chemical compounds that absorb light in the ultraviolet and violet region of the electromagnetic spectrum, i.e. around 300-430 nm, and re-emit light in the violet and blue region by fluorescence, i.e. around 400-500 nm.

Optical brighteners which are usable according to the present invention are e.g. those which belong to the class represented by 4,4'-bis(2-benzoxazolyl)stilbene and its derivatives, like those having alkyl substituents on the aromatic rings, and those which belong to the class represented by 2,5-bis(benzoxazol-2-yl)thiophene and its derivatives, like those having alkyl substituents on the aromatic rings. Further optical brighteners are disclosed in paragraph [0004] of US 2009/0137445 A1. A particular preferred optical brightener is 2,5-bis(5-tert-butyl-benzoxazol-2-yl) thiophene which is also known as 2,5-thiophenediylbis(5-tert-butyl-1,3-benzoxazole) (CAS-Nr. 7128-64-5).

Other known optical brighteners which may be used alternatively or additionally are those disclosed in US 2009/0137445 A1, i.e. inorganic optical brighteners based on so-called inorganic phosphors, i.e. synthetically produced crystalline compounds preferably having a particle size distribution of from 0.01 to 20 μm, wherein said inorganic phosphors are preferably selected from the group consisting of sulfides and selenides, oxysulfides, oxygen-dominant phosphors and halide phosphors, more preferably selected from the group consisting of $BaMgAl_{10}O_{17}$:Eu, $BaMg_2Al_{16}O_{27}$:Eu, $Sr_3Ca_2(PO_4)_3Cl$:Eu and $(SrBaCa)_5(PO_4)_3Cl$:Eu, wherein the content of europium is from 0.1 to 0.5 mole %.

As indicated above, the optical brightener is present in an amount of 0.001 to 0.1 wt % based on the weight of the polyolefin composition, preferably 0.001 to 0.05 wt %, more preferably 0.003 to 0.03 wt %.

Polyolefin Composition

The polyolefin composition of the present invention may have a density of 0.915 to 0.955 g/cm³, preferably 0.920 to 0.950 g/cm³.

The polyolefin composition of the present invention may comprise further usual additives, preferably in a total amount of not more than 5 wt % in total, i.e. the sum of the contents of polyolefin (A), carbon black (B), optical brightener (C), and UV agent (D), is preferably at least 95 wt % based on the weight of the polyolefin composition of the present invention.

The polyolefin composition according to the present invention may further comprise an antioxidant, such as sterically hindered phenol, phosphorus-based antioxidant, sulphur-based antioxidant, nitrogen-based antioxidant, or mixtures thereof. In particular, a mixture of equal amounts of pentaerythritol tetrakis(3-(3,5-di-tert-butyl-4-hydroxyphenyl)propionate) and tris(2,4-di-tert-butylphenyl)phosphite (Irganox B225) may be used as antioxidant.

The polyolefin composition according to the present invention may further comprise an antistatic agent, such as calcium stearate, sodium stearate or zinc stearate.

Molded Article

The present invention is in a further aspect directed to a molded article comprising, preferably consisting of, the polyolefin composition of the present invention as described above including all preferred embodiments.

Suitable molded articles are e.g. automotive parts or outer layers of a wire or cable, e.g. of a power or communication wire or cable.

According to a particular preferred embodiment, the molded article according to the present invention is an outer layer of a wire or cable, in particular of a fiber optic micro cable (FOC), i.e. a cable jacket.

The present invention is in a further aspect directed to a cable comprising an outer layer comprising, preferably consisting of, the polyolefin composition of the present invention as described above including all preferred embodiments.

Detection by UV Light

The present invention is in a further aspect directed to a method for detection of a polyolefin composition by UV light comprising the following steps
  providing a polyolefin composition of the present invention as described above including all preferred embodiments,
  irradiating the polyolefin composition with UV light,
  detecting fluorescence emitted from the polyolefin composition.

The present invention is in a further aspect directed to a method for detection of a molded article or a cable by UV light comprising the following steps
  providing a molded article or a cable as described above including all preferred embodiments,
  irradiating the molded article or the cable with UV light,
  detecting fluorescence emitted from the molded article or the cable.

The UV light may have any suitable wavelength. The wavelength of the UV light is suitably 250-400 nm.

The fluorescence emitted from the polyolefin composition, the molded article, or the cable according to the present invention, respectively, may be detected by usual methods known to the skilled person. One possible and easy way of detecting the emitted fluorescence is by visual inspection.

In the following the present invention is further illustrated by means of examples.

EXAMPLES

1. Definitions/Measuring Methods

The following definitions of terms and determination methods apply for the above general description of the invention as well as to the below examples unless otherwise defined.

Density

Density is measured according to ISO 1183-1—method A (2004). Sample preparation is done by compression moulding in accordance with ISO 1872-2:2007.

Flexural Modulus

Flexural modulus was determined according to ISO 178: 2010/Amd.1:2013.

Melt Flow Rate

Melt flow rate $MFR_2$ of polyethylene was determined according to ISO 1133 at 190° C. under a load of 2.16 kg. Melt flow rate $MFR_2$ of polypropylene was determined according to ISO 1133 at 230° C. under a load of 2.16 kg.

2. Examples

The following materials and compounds are used in the Examples.

PE1 poly(ethylene-co-(1-butene)) copolymer having a density of 963 kg/m³, an $MFR_2$ of 12 g/10 min, mixed with 39 wt % of carbon black (CB)

PE2 bimodal high density polyethylene (HDPE) having a density of 944 kg/m³, an $MFR_2$ of 1.7 g/10 min, a flexural modulus of 850 MPa, commercially available as Borstar HE6068 from Borealis AG Optical brightener 2,5-thiophenediylbis(5-tert-butyl-1,3-benzoxazole), commercially available as Tinopal OB CO from BASF SE UV agent Tinuvin 783 FDL commercially available from BASF SE Antioxidant Irganox B225 commercially available from BASF SE Antistatic agent calcium stearate commercially available as Ceasit SW from Baerlocher GmbH PE2 is used as base resin and contains already 0.2 wt % of the antioxidant, 0.15 wt % of the antistatic agent and 0.3 wt % of the UV agent.

Three samples were prepared using PE1 as the carbon black masterbatch (MB), wherein PE1 was compounded with the base resin PE2 in an amount such that the amount of carbon black in the final composition is 0.5 wt % for each of the three samples (see Table 1). In the sample of the comparative example CE1 no optical brightener is added. In the samples of the inventive examples IE1 and IE2 optical brightener is added.

Compounding was implemented on ZSK 18 MEGAlab laboratory twin screw extruder under the following conditions: speed 200 rpm; melt temperature 175-190° C.; pressure 45-50 bar; output 5 kg/h. Plaques of size 150×80×3 mm were produced from the resulting composition using injection moulding on Engel ES 700H/80V/700H/250 3K machine under following conditions: injection speed 11 mm/s; injection time 3.4 sec; switching pressure 66 bar; holding time during backpressure 15 sec; cooling time 20 sec; cycle time 45 sec; melt temperature 150° C.; mould temperature 50° C.

TABLE 1

Compositions of examples

| | wt % | | |
|---|---|---|---|
| Constituents | CE1 Sample 1 | IE1 Sample 2 | IE2 Sample 4 |
| PE2 | 98.75 | 98.74 | 98.745 |
| PE1 | 1.25 | 1.25 | 1.25 |
| Optical brightener | – | 0.01 | 0.005 |
| UV agent | + | + | + |
| Antioxidant | + | + | + |
| Antistatic agent | + | + | + |

"+" indicates the presence of these compounds in PE2

Laser marking was carried out using Laser machine, "SpeedMarker 700, 20 W Fiber laser". For marking, a frequency range of 20-100 kHz and a power varying between 5-70% of 20 W was used. Speed was kept constant at 2000 mm/s.

FIG. 1 shows the laser printed samples as indicated in Table 1 above, wherein these samples are irradiated with UV light, here 250-400 nm.

Each square represents a combination of frequency to power of the ranges indicated above.

The laser printed samples were irradiated with UV light (wavelength 250-400 nm). As can be seen from FIG. 1, the inventive samples containing the optical brightener show fluorescence when irradiated with UV light.

The invention claimed is:

1. A method for detection of a cable by UV light comprising the following steps:
   providing a cable,
   irradiating the cable with UV light,
   detecting fluorescence emitted from the cable,
   the cable comprising an outer layer comprising a polyolefin composition comprising:
   (A) a polyolefin,
   (B) carbon black in an amount of 0.25 to 1.0 wt % based on the weight of the polyolefin composition,
   (C) an optical brightener in an amount of 0.001 to 0.1 wt % based on the weight of the polyolefin composition, and
   (D) a UV agent.

2. The method according to claim 1, wherein the outer layer of the cable consists of the polyolefin composition.

3. The method according to claim 1, wherein the polyolefin is selected from the group consisting of an ethylene homopolymer, an ethylene copolymer, a propylene homopolymer, a propylene copolymer, a blend of an ethylene homopolymer and an ethylene copolymer, and a blend of a propylene homopolymer and a propylene copolymer.

4. The method according to claim 3, wherein the ethylene copolymer is a copolymer of ethylene and a $C_3$-$C_{12}$-alpha-olefin.

5. The method according to claim 3, wherein the propylene copolymer is a copolymer of propylene and ethylene and/or a $C_4$-$C_{12}$-alpha-olefin.

6. The method according to claim 1, wherein the polyolefin is high density polyethylene (HDPE).

7. The method according to claim 1, wherein the polyolefin is polypropylene.

8. The method according to claim 1, wherein the amount of carbon black is 0.25 to 0.75 wt % based on the weight of the polyolefin composition.

9. The method according to claim 1, wherein the amount of carbon black is 0.25 to 0.5 wt % based on the weight of the polyolefin composition.

10. The method according to claim 1, wherein the amount of the optical brightener is 0.001 to 0.05 wt % based on the weight of the polyolefin composition.

11. The method according to claim 1, wherein the amount of the optical brightener is 0.003 to 0.03 wt % based on the weight of the polyolefin composition.

12. The method according to claim 1, wherein the optical brightener is 2,5-thiophenediylbis(5-tert-butyl-1,3-benzoxazole).

13. The method according to claim 1, wherein the amount of the UV agent is 0.1 to 1.0 wt % based on the weight of the polyolefin composition.

14. The method according to claim 1, wherein the content of the polyolefin (A) in the polyolefin composition is at least 90 wt %.

15. The method according to claim 1, wherein the sum of the contents of polyolefin (A), carbon black (B), optical brightener (C), and UV agent (D) is at least 95 wt % based on the weight of the polyolefin composition.

16. The method according to claim 1, wherein the cable is a fiber optic micro cable.

* * * * *